United States Patent [19]

Wackerman

[11] 4,281,633

[45] Aug. 4, 1981

[54] BARBECUE GRILL WITH SNUFFING MEANS AND HEAT CONTROL

[75] Inventor: Gunther G. Wackerman, Paris, Ill.

[73] Assignee: Unarco Industries, Inc., Chicago, Ill.

[21] Appl. No.: 56,297

[22] Filed: Jul. 10, 1979

[51] Int. Cl.³ .............................................. A47J 37/00
[52] U.S. Cl. ............................. 126/25 C; 126/25 A; 126/25 R
[58] Field of Search ................ 126/25 C, 25 A, 25 R, 126/9 R, 9 A, 9 B, 41 R, 41 A

[56] References Cited

U.S. PATENT DOCUMENTS

| | | | |
|---|---|---|---|
| 1,455,915 | 5/1923 | Johnson | 126/25 C |
| 3,021,830 | 2/1962 | Witcher | 126/25 C |
| 3,126,881 | 3/1964 | Blotsky, Jr. | 126/25 C |
| 3,320,942 | 5/1967 | Christensen | 126/25 C |

Primary Examiner—Albert W. Davis
Assistant Examiner—Wesley S. Ratliff, Jr.
Attorney, Agent, or Firm—Clement and Ryan

[57] ABSTRACT

An outdoor barbecue grill which includes a kettle containing grill means on which to support foodstuffs to be cooked, a grate for burning coals, and usually an ash pan positioned below the grate. Means are provided to move the coal-bearing grate vertically to control the spacing between the grill and the grate and the flow of fresh air into the interior of the kettle, both of which affect the intensity of the heat that is applied to the foodstuff to be cooked. The same means actuates a snuffing device for extinguishing the coals altogether when the cooking is completed.

15 Claims, 5 Drawing Figures

BARBECUE GRILL WITH SNUFFING MEANS AND HEAT CONTROL

This invention relates to an outdoor barbecue grill, and in particular one in which:

(1) an easy and convenient way is provided to shut off the flow of air to the hot coals in the grill when it is desired to snuff out the fire after the grill has been used, (2) during cooking, the distance between the grate that supports the hot coals and the grill that supports the meat or other foodstuffs to be cooked is vertically adjustable, and (3) the amount of air permitted to pass into the interior of the kettle of the device when it is in use may be regulated as desired, with the snuffing action, vertical adjustment of the coal grate, and regulation of air flow all being controlled by the same actuating means.

BACKGROUND OF THE INVENTION

A large number of outdoor barbecue grills for cooking meat or other foodstuffs over a bed of hot coals are known in the prior art. Many of these include kettle means for containing the foodstuff to be cooked and the hot coals for cooking the same, and a cover means for the kettle to retain the heat therein.

In barbecue grills of the prior art, draft vents for the introduction of fresh air to the burning coals on the grate are usually provided—for cooking temperature control—in the bottom wall of the kettle of the grill. These vents are typically arranged in three clusters of openings, with rotatable covers that may be moved from a closed to an open condition, and returned, as desired.

Such draft vent openings and their associated closures are unsatisfactory for a number of reasons. Even when in good operating condition, the rotatable covers frequently become so hot when the grill is in use that it is difficult to grasp them and move them from one position to another for regulation of the cooking temperature. In some grills the vent openings also serve as discharge outlets for ash from the grate, and in these grills the openings may become blocked with clinkers or large pieces of unburned charcoal. After a period of outdoor use, the rotatable covers may become so rusted as to interfere with their proper operation. After any period of long use, the covers may become so loose that the closures they provide are inadequate.

Furthermore, in the usual situation in which there are three or more clusters of draft vent openings, several settings of the respective covers are required to control the inflow of air, instead of the single setting of the present invention. Finally, the extra pieces required to be fabricated for such closures add significantly to the over-all cost of manufacture of the grill.

SUMMARY OF THE INVENTION

All the indicated disadvantages of prior art grills are avoided by the barbecue grill of the present invention.

In this invention, the kettle is supported in an elevated position by a support means, such as the hollow column of the preferred embodiment of the invention, that defines a slot having a vertically extending segment and at least one generally horizontally extending segment that communicates with the vertical segment. A grate for the burning coals is positioned in the interior of the kettle below the grill upon which the foodstuffs to be cooked are placed, which grill is supported in an upper interior portion of the kettle. An ash pan is usually provided that is adapted for positioning in the interior of the kettle below the grate.

A generally vertical post member is positioned adjacent the support means. Generally horizontal handle means has one end secured to the post member, a midportion that extends through the slot defined by the support means, and an opposite end which extends away from the support means and is grippable by a user of the grill.

The post member has an upper end that engages either the ash pan or the grate. The other one of these two elements is supported by (1) a lower interior portion of the kettle when that other element which is not supported by the post member is the ash pan, and (2) by the ash pan when the other element is the grate. Preferably, the upper end of the vertical post member engages the ash pan, and the grate is supported by the ash pan.

As a result of this construction, the coal grate can be vertically adjusted in relation to the grill upon which foodstuffs are to be placed by moving the handle means in the slot from a first position at a predetermined height to a second position at a different predetermined height.

The kettle of the barbecue grill of this invention is provided with draft vent means, comprising at least one draft vent, in the bottom thereof. In the preferred embodiment of the grill there is a single draft vent, annular in form, that is defined by (a) a flange rising from the bottom wall of the kettle (which may be considered to be either an extension of the hollow cylindrical support column for the kettle or a part of the bottom wall of the kettle) and (b) the vertically movable post member, which is positioned within the hollow kettle support column.

An important element of this invention is the snuffing means provided for cutting off the flow of fresh air to the hot coals, when the cover means is in place on the kettle and it is desired to extinguish the coals instead of letting them burn themselves out with an unlimited supply of fresh air. The snuffing means is actuated by movement of the vertically movable post member, and is desirably carried by the post member. It may be a separate member mounted on the post member, but preferably is the bottom wall of the ash pan itself.

When the support means for the kettle is a hollow column and the vertically movable post member is positioned within the column with the ash pan secured to its upper end, the annular draft vent defined by the vertical post and the hollow column is closed by the ash pan when the post is in its lowermost position, and admits the maximum amount of fresh air when the post in its uppermost position.

To prevent coals from falling off the grate, particularly when the grate is in the upper position, a ring member may be provided, and is supported by the ash pan. The ring member has an upstanding generally vertical wall that extends above the grate for retaining the coals on the grate.

With the barbecue grill of the present invention, three things are achieved by movement of a single member, i.e., the vertical post member:

1. The intensity of the heat on the foodstuff to be cooked is controlled in a relatively easy and convenient manner, in part by adjusting the elevation of the grate in any one of a plurality of positions that are provided in this device.

2. The burning coals may be snuffed out after the cooking of the foodstuffs on the grill has been completed.

3. The amount of fresh air introduced into the interior of the kettle during cooking can be easily and conveniently controlled, which helps to control the intensity of the heat on the foodstuffs to be cooked.

BRIEF DESCRIPTION OF DRAWINGS

The invention will now be described with reference to the attached drawing, in which.

DETAILED DESCRIPTION OF THE SPECIFIC EMBODIMENT

Kettle and Hollow Support Column

Figure 1:
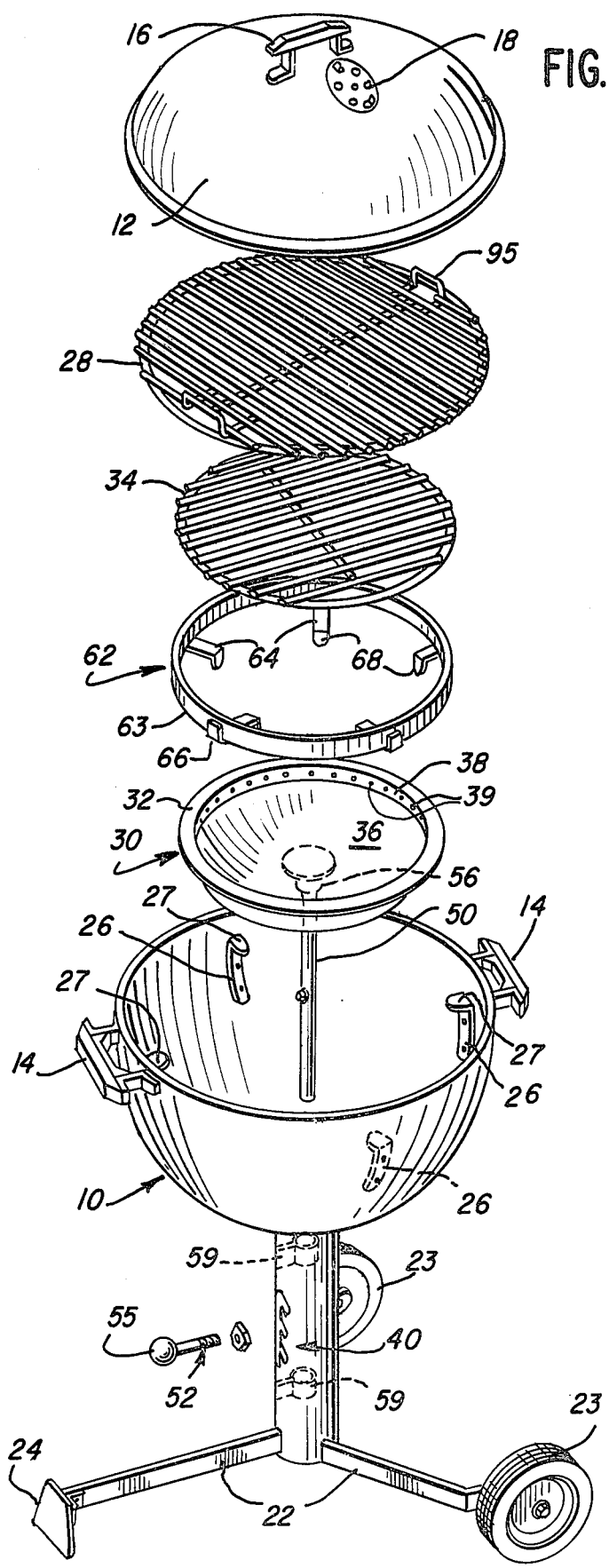
FIG. 1 is an exploded perspective view of the outdoor barbecue grill of this invention.
Figure 3:
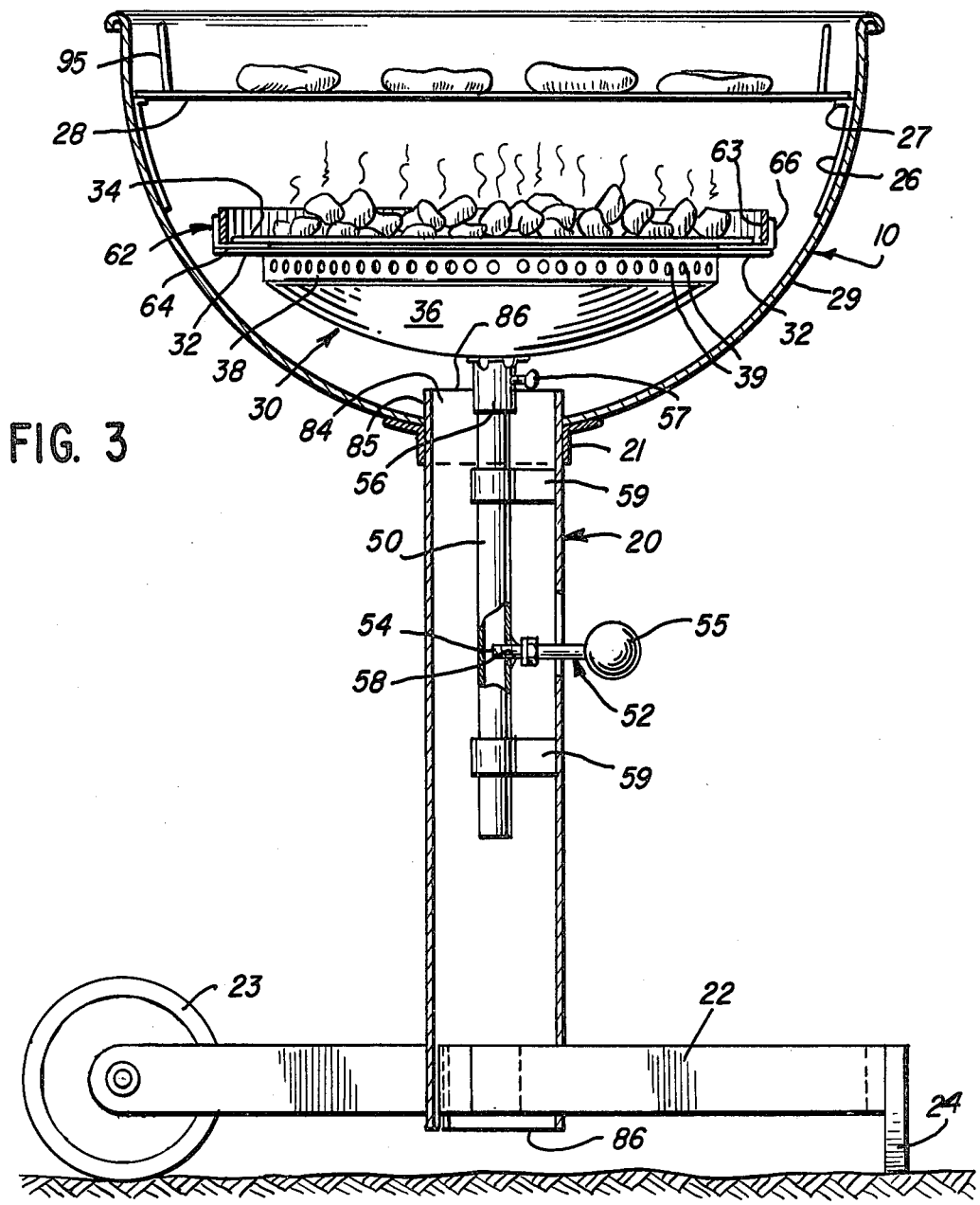
FIG. 3 is a cross-sectional view of the assembled barbecue grill in which the bottom wall of the ash pan is the snuffing means, with the lid or cover means omitted and the vertical post member partially broken away for clarity.

In the preferred embodiment which is illustrated in FIGS. 1 and 3, kettle means 10 having lid or cover means 12 is provided for containing the hot coals and the foodstuff to be cooked. Kettle 10 is provided with handles 14 and lid 12 with handle 16.

Lid 12 is provided with draft vents and vent cover 18 through which heated air and fumes escape from the kettle when it is covered by lid 12. As described below, draft vent means is provided in the bottom wall of kettle 10 through which fresh air to support the combustion of the charcoal is drawn during use of the grill.

Kettle 10 is supported in an elevated position by generally vertically extending support means 20, which in the embodiment shown is a hollow column. The upper end of the column is secured to the bottom wall of kettle 10 by means of flanged sleeve 21 (FIG. 3) that has its tubular portion secured to the column and its flanged rim secured to the bottom wall of the kettle.

Three legs 22 are secured to a lower portion of the column. For convenience, two of the legs terminate in wheels 23, upon which the barbecue grill may be rolled from one position to another when the other leg 22, terminating in a foot 24 of plastic, metal or other suitable material, is raised off the ground.

Grill, Coal Grate and Ash Pan

Brackets 26 are secured to the inner surface of the side wall of kettle 10, to support wire grill 28 upon which the foodstuff to be cooked is placed. Horizontally extending upper finger 27 of each bracket provides support for wire grill 28.

Grill means 28 is supported in the upper interior portion of kettle 10. Ash pan 30 is supported in the interior of kettle 10 below grill 28. Grate means 34 supports the bed of hot coals and, in the embodiment shown in FIGS. 1 and 3, is supported, in a position spaced below grill 28, by outwardly extending flange 32 of ash pan 30.

In use, charcoal briquettes are placed on grate 34, lighted, and brought to the required state of a bed of glowing coals. The foodstuffs to be cooked are placed upon wire grill 28 above the bed of hot coals.

Ash pan 30 has an imperforate bottom wall 36. Its side wall 38 defines a plurality of draft vents 39 through which fresh air can flow to reach the bed of hot coals. When burning coals are present on grate 34, the convection currents of hot air rising from the hot coals draw drafts of fresh air inwardly through the draft vent means in the bottom wall of kettle 10 and vents 39 in side wall 38 of ash pan 30, and thence through and across the bed of hot coals, to support the combustion of the charcoal.

Only a relatively insignificant portion, if any, of the ash resulting from the burning of the charcoal may filter between ash pan 30 and the side walls of kettle 10 or out through vent holes 39.

Vertical Adjustability of Coal Grate

Figure 2:
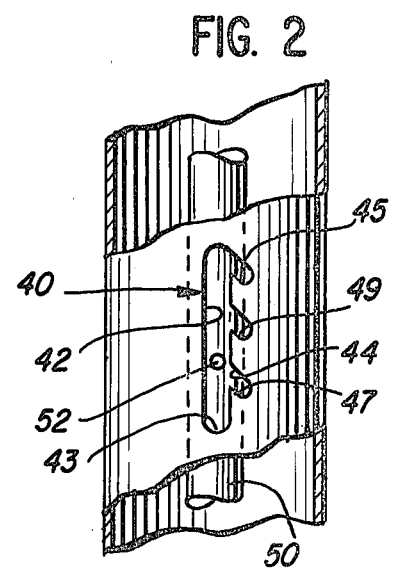
FIG. 2 is a fragmentary, enlarged elevational view of the member which supports the barbecue kettle in an elevated position.

Grate 34 is vertically adjustable relative to grill 28 for varying the intensity of the heat on the foodstuff which is supported by the grill. In order to accomplish this, support means 20 defines slot 40, which is best seen in FIG. 2. Slot 40 includes a generally vertically extending segment 42, and at least one generally horizontally extending segment 44. In the illustrated embodiment, three horizontal segments 44 are shown, although a larger or smaller number can be used. Vertical segment 42 and generally horizontal segments 44 define a first position 43 at a lowermost predetermined height and a second position 45 at an uppermost predetermined height.

As shown in FIG. 3, post member 50 is positioned adjacent to support means 20, and in this embodiment is disposed within support means 20. Handle means 52 has one end secured to a midportion of the post member, as by threaded means 54 received 52 is kept in position by the force of gravity until the user lifts handle 52 to adjust the height of grate 34. Movement of the handle correspondingly moves grate 34 because the handle is secured to post member 50 which is in engagement with ash pan 30 which in turn, in the preferred embodiment, supports grate 34.

Preferably, the outer diameter of post member 50 is no greater than one-half the inside diameter of hollow column 20. To maintain the post member in the desired generally vertical orientation, at least two spaced apart brackets 59 are provided. In the embodiment shown, each guide bracket is positioned in column 20 and has one end secured to the inside surface of the column, to define a through aperture having an inside diameter at least as large as and approximately equal to the outer diameter of post member 50. The post member is received in the apertures defined by the brackets and is movable vertically relative to the brackets.

Figure 4:
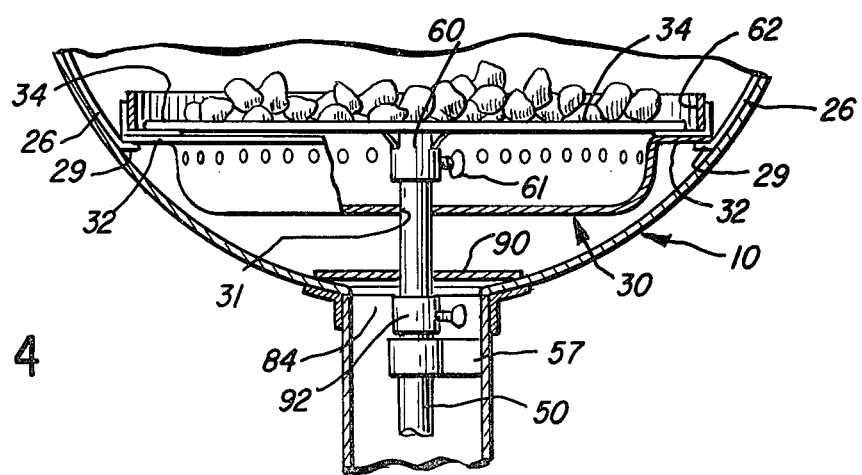
FIG. 4 is a fragmentary cross-sectional view of an alternative embodiment of the barbecue grill of this invention, in which the coal grate is mounted directly on the vertical post member and the snuffing means and ash pan are separate members.

An alternative embodiment of the barbecue grill of this invention is shown in FIG. 4. In this embodiment, post member 50 is secured directly to grate means 34 by means of socket 60, with a through aperture 31 being provided in bottom wall 36 of ash pan 30 through which post member 50 extends. Ash pan 30 is supported by having flange 32 engaging and resting upon horizontally extending lower fingers 29 of bracket 26.

So far as adjustment of the spacing between grill 28 and coal grate 34 is concerned, with one exception the alternative embodiment of FIG. 4 operates in a similar manner to the embodiment illustrated in FIGS. 1 through 3, with movement of the in threaded opening 58. Handle 52 is generally horizontal and includes a midportion that extends through slot 40. Thus, the diameter of handle 52 is no greater than the width of slot 40. Handle 52 further includes an opposite end which extends away from support means 20, and which may include a knob portion 55 that it is easily grippable by a user.

In the preferred embodiment shown, the upper end of post member 50 engages bottom wall 36 of ash pan 30. As illustrated in FIG. 3, the upper end of post member 50 is slidably received in socket 56, which has a vertical wall with an inner diameter slightly greater than the outer diameter of the post member, and a generally horizontal wall that is secured to bottom wall 36 of ash pan 30. If desired, thumb screw 57 may be threadably inserted in a threaded opening in the vertical wall of socket 56, to provide a more positive securement between ash pan 20 and vertical post 50.

The ash pan is removable from the kettle (after unscrewing thumb screw 57, if it is present) by lifting the ash pan off the post. To make thumb screw 57 more easily available, vertical slot 42 in hollow column 20 may be extended in the upward direction. Or, alternatively, handle 52 may be unscrewed from post 50 to make it possible to lift ash pan 30 out of kettle 10 with post 50 still secured to it.

Referring to FIGS. 1 and 2, coal grate 34 is vertically adjustable relative to grill 28 by moving handle 52 in slot 40 from lowermost position 43 to uppermost position 45 or to either of intermediate positions 47 or 49. Since generally horizontal segments 44 have a downward slant, handle handle vertically causing a corresponding vertical movement of the grate means. The exception is that in the embodiment shown in FIGS. 1 through 3 the post member engages the ash pan on which the grate means is supported, while in the alternative embodiment the ash pan remains at the same elevation at all times since it is supported by fingers 29, and the post member directly engages the grate means.

Coal Retainer Means

A further feature of the present invention is the use of means for retaining the hot charcoal on the grate, so that the charcoal is prevented from falling off the grate and down the wall of kettle 10. This potential problem is of particular importance where the grate is in a raised position in which there is a space between the outer edge of the grate and the wall of the kettle due to the curvature of the kettle wall, as shown in FIG. 3.

The retaining means preferably comprises a ring member 62 (FIG. 1) that includes an upstanding generally vertical wall 63. The ring member further includes a plurality of legs which each have an inwardly extending generally horizontal segment 64, an upstanding flange 66 at one end of the horizontal segment that is secured to the outer surface of vertical wall 63, and a downwardly directed generally vertical flange 68 at the opposite end of horizontal segment 64.

As shown in FIG. 3, ring member 62 is supported by ash pan 30, with the bottom surface of horizontal segments 64 engaging the upper surface of outwardly extending flange 32 of the ash pan. Vertical flanges 68 are locator means which prevent relative movement between ash pan 30 and ring member 62 in the horizontal plane.

The internal diameter of vertical wall 63 is at least as great as and about equal to the outer diameter of grate 34. Since the grate engages and is supported by the upper surface of horizontal segments 64, vertical wall 63 extends above the height of the grate. Accordingly, ring member 62 prevents charcoal from falling off grate 34.

Figure 5:
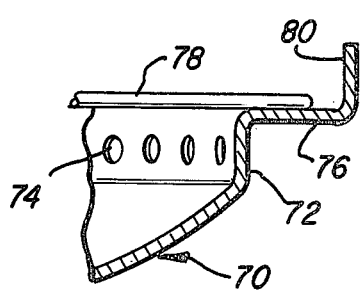
FIG. 5 is a fragmentary cross-sectional view of an alternative embodiment of a coal grate and ash pan for the barbecue grill of the present invention.

Another embodiment of the retaining means is depicted in FIG. 5. In this embodiment, ash pan 70 has a side wall 72 that defines a plurality of draft vents 74 through which air can move through and across the bed of hot coals located on the grate means. Ash pan 70 also includes an outwardly extending flange 76 on which grate means 78 is supported. The outer end of flange 76 is turned upwardly to define an upstanding generally vertical wall 80 which comprises the charcoal retaining means. The inner diameter of vertical wall 80 is at least as great as and about equal to the outer diameter of grate 34 so that the vertical wall contains the charcoal on the grate.

Snuffing Means

In the specific embodiments of this invention now being described, instead of the conventional draft vents which are typically provided in the bottom wall of a kettle to supply fresh air to support the combustion of the charcoal, an annular opening 84 is provided in the bottom wall of the kettle, with the outer diameter of the opening approximately equal to the inner diameter of hollow column 20 (FIG. 3). In this embodiment of FIG. 3 annular opening 84 is defined by post member 50 positioned within column 20 and by flange 85, which in structural terms may be considered to be comprised of the upper end of column 20 which extends upward into the interior of kettle 10 or in functional terms may be considered to be a part of the bottom wall of kettle 10, and post member 50 positioned within column 20. In the embodiment of FIG. 4, annular opening 84 is defined by the bottom wall of kettle 10 and post member 50.

Column 20 has opening 86 at the bottom end thereof. Air enters opening 86, rises through the interior of the column, and enters kettle 10 through opening 84.

As will be seen from FIG. 3, when bottom wall 36 of ash pan 30 is lowered to the lowermost position of post 50, wall 36 seats against upper lip 87 of flange 85 on support column 20. This cuts off the supply of additional fresh air to the interior of kettle 10, and when cover 12 is in place on top of kettle 10 this will result in extinguishing the fire in the coals of grate 34.

If the curvature of bottom wall 36 of ash pan 30 is made sharper than the curvature of the bottom of kettle 10, flange 85 on column 20 may be omitted if desired. Ash pan 30 can then seat directly against the bottom wall of kettle 10 and fit into the opening of annular draft vent 84 to close the opening off. Other configurations of bottom wall 36 of the ash pan may be employed, so long as line contact is produced between wall 36 and the bottom wall of kettle 10 when post member 50 is in its lowermost position.

In the embodiment of FIG. 4, the snuffing means for cutting off the flow of fresh air into the interior of kettle 10 is comprised of annular plate 90, which is large enough to close off annular draft vent 84 when it rests on the bottom of kettle 10. Annular plate 90 is carried slidably by vertically movable post member 50. When vertical post 50 is raised, collar 92 secured to it lifts plate 90 away from draft vent 84 and permits air to flow into the interior of the kettle.

In this embodiment, coal grate 32 is supported directly by post member 50, through flange 60 and thumb screw 61. Outwardly extending flange 32 of ash pan 30 is supported by inwardly extending fingers 29 at the bottom of brackets 26.

As will be understood by one skilled in the art, although the annular draft vent shown in FIGS. 3 and 4 is preferred, other locations and configurations of draft vents in the bottom wall of kettle 10 may be utilized. Other snuffing means may also be employed in the barbecue grill of this invention, so long as they are actuated by vertical movement of post member 50.

Single Actuating Means

Adjustment of the amount of fresh air that is permitted to flow upward through column 20 into kettle 10 is achieved in this invention by the same actuating means that controls the spacing of the coal grate means below the grill, i.e., vertically movable post member 50. Likewise, snuffing of the burning coals after the grill has been used is accomplished by the same means.

As is apparent from FIG. 3, when the burning coals supported on grate 34, which in turn is supported by ash pan 30 carried by vertically movable post 50, are raised to bring them closer to the foodstuff disposed on grill 28, this affects the heat applied to those foodstuff in two ways. First of all, of course, the coals are brought closer to the foodstuff being cooked. Second, the flow of fresh air is increased through column 20 into kettle 10, and thence through vents 39 to pass over and through the bed of burning coals, thereby accelerating the combustion of the coals.

By the same token, the position occupied by post 50 when handle 52 is in the lowermost horizontal slot segment 47 represents the coolest cooking situation. This is so for two reasons—with this position of handle 52, the bed of hot coals is spaced farthest from the foodstuff on grill 28, and bottom wall 36 is spaced above lip 87 a distance that permits the smallest quantity of air to pass into the interior of kettle 10.

When handle 52 is in its lowermost position 43, the snuffing means (such as bottom wall 36 of ash pan 30 or annular plate member 90) seats against lip 87 or the rest of bottom wall of the kettle to close off the supply of fresh air to the kettle, and thereby extinguish the coals altogether.

Removal of Grill, Grate and Ash Pan from Kettle

As will be seen, grill 28 may be removed from the interior of kettle 10 by means of handles 95 on opposite sides of the grill. In the embodiments disclosed, grate 34 and ash pan 30 are likewise separately removable from kettle 10 for cleaning and other maintenance.

The latter two elements may be removed by hand, or may if desired be removed by employing a pair of hooklike instruments that may be inserted beneath the individual wires of grate 34 or into the individual vent holes 39 of ash pan 30. In either case, the ashes and unburned charcoal can be reliably removed from kettle 10 without any spilling or attendant mess that accompanies the use of many of the prior art barbecue grills.

If desired, by use of the hooklike instruments referred to just above, ash pan 30 may be removed from kettle 10 with grate 34 resting upon it. In this case, the ash pan, grate and unburned charcoal and ashes may be carried together to the point of disposal of the ashes and other waste.

Whether grate 34 and ash pan 30 are removed from kettle 10 separately or together, when the point of disposal is reached the grate can be removed altogether from the ash pan, and thus the contents of the ash pan may all be discarded without any problem of having some portions of unburned charcoal remain wedged between the grate and ash pan in a position from which it is difficult to remove such debris.

Hemispherical Grill Preferred

As is seen from the drawing, in the preferred embodiment disclosed kettle means 10 is generally hemispherical in shape. The grill 28, grate 34, and ash pan 30 are each circular in shape. As a result, the bed of coals can be distributed symetrically about the center of grate 34. Thus the heating power of the bed of coals is uniform around the entire 360° of the bed of coals.

Similarly, the foodstuff to be cooked can be distributed symetrically about the center of grill 28. It follows that the foodstuff may be heated uniformly around the 360° of the grill.

The above detailed description of this invention has been given for clarity of understanding only. No unnecessary limitations should be understood therefrom, as modifications will be obvious to those skilled in the art.

What is claimed is:

1. An outdoor barbecue grill for cooking meat or other foodstuffs over a bed of hot coals, which comprises:

kettle means for containing the foodstuff to be cooked and the hot coals for cooking the same, said kettle means having draft vent means in its bottom wall, said draft vent means adapted to be selectively put in a closed condition, a partially open condition, and a fully open condition;

cover means for said kettle means;

grill means for holding the foodstuff to be cooked, said grill means being supported by said kettle in the upper interior portion thereof;

generally vertical support means for supporting said kettle in an elevated position, said support means defining a slot, said slot including a generally vertically extending segment and at least one generally horizontally extending segment communicating with said vertical segment, said segments defining a first position at a lowermost predetermined height and a second position at an uppermost predetermined height;

grate means adapted for positioning in the interior of said kettle below said grill means for supporting said bed of hot coals;

a generally vertical post member positioned adjacent said support means, said post member having an upper end that supports said coal grate means, and having lowermost and uppermost positions, respectively, that correspond to said first and second positions defined by said slot segments in said vertical support means;

means slidably supporting said post member in a generally vertical position as aforesaid and permitting vertical movement of said post from its lowermost position to its uppermost position;

generally horizontal handle means, said handle means having one end secured to said vertical post member, a midportion that extends through said slot, and an opposite end that extends away from said support means and is grippable by a user; and snuffing means actuated by vertical movement of said post member, said snuffing means being adapted to close said draft vent means in the bottom wall of said kettle when said post is in its said lowermost position and to open said draft vent means when said post is raised above said lowermost position;

whereby (a) said coal grate means is vertically adjustable relative to said grill means by moving said handle means in said slot segments from said first position at a lowermost height to said second position at an uppermost height, (b) said snuffing means closes said draft vent means when said post member is in its said lowermost position, and (c) said snuffing means puts said draft vent means in its said fully open condition when said post member is in its said uppermost position.

2. The outdoor barbecue grill of claim 1 which includes an ash pan adapted for positioning in the interior of said kettle below said coal grate means, and in which the upper end of said post member engages one of said ash pan and said grate means, the other of said ash pan and said grate means being supported by (a) a lower interior portion of the kettle means where said other element is the ash pan and (b) the ash pan where said other element is the grate means.

3. The outdoor barbecue grill of claim 1 in which said snuffing means comprises an ash pan adapted for positioning in the interior of said kettle below said coal grate means, said ash pan being supported by the upper end of said vertically movable post member, and the bottom wall of the ash pan being adapted to provide a closure, when said vertical post member is in its said lowermost position, for said draft vent means in the bottom wall of the kettle.

4. An outdoor barbecue grill for cooking meat or other foodstuff over a bed of hot coals, which comprises:

kettle means for containing the foodstuff to be cooked and the hot coals for cooking the same, said kettle means having draft vent means in its bottom wall, said draft vent means adapted to be selectively put in a closed condition, a partially open condition, and a fully open condition;

cover means for said kettle means;

grill means for holding the foodstuff to be cooked, said grill means being supported by said kettle in the upper interior portion thereof;

generally vertical support means comprising a hollow column for supporting said kettle in an elevated position, said hollow column being open at its top end to provide communication with said draft vent means in the bottom of the kettle and being open at its bottom end to provide a passage for air from the exterior of the kettle through said hollow column to the interior of the kettle, said support means defining a slot, said slot including a generally vertically extending segment and at least one generally horizontally extending segment communicating with said vertical segment, said segments defining a first position at a lowermost predetermined height and a second position at an uppermost predetermined height;

grate means adapted for positioning in the interior of said kettle below said grill means for supporting said bed of hot coals;

a generally vertical post member positioned within said hollow column and extending into the interior of said kettle to define, together with the bottom wall of said kettle means, said draft vent means in the form of an annular draft vent through which fresh air can be admitted into the kettle interior, said post member having an upper end that supports said coal grate means, and having lowermost and uppermost positions, respectively, that correspond to said first and second positions defined by said slot segments in said vertical support means;

means slidably supporting said post member in a generally vertical position as aforesaid and permitting vertical movement of said post from its lowermost position to its uppermost position;

generally horizontal handle means, said handle means having one end secured to said vertical post member, a midportion that extends through said slot, and an opposite end that extends away from said support means and is grippable by a user; and snuffing means carried by said vertically movable post member, said snuffing means being adapted to close said annular draft vent in the bottom wall of said kettle when said post is in its said lowermost position and to open said draft vent when said post is raised above said lowermost position, whereby (a) said coal grate means is vertically adjustable relative to said grill means by moving said handle means in said slot segments from said first position at a lowermost height to said second position at an uppermost height, (b) said snuffing means closes said annular draft vent when said post member is in its lowermost position, and (c) said snuffing means puts said annular draft vent in its fully open condition when said post member is in its uppermost position.

5. The outdoor barbecue grill of claim 4 in which said draft vent means has a plurality of partially open conditions, and said slot defined by the generally vertical support means includes a plurality of said generally horizontally extending segments communicating with said vertical segment, each of which horizontal segments defines a position at a predetermined height, so that the particular one of said slot segments in which said handle means is positioned at any given time determines which of said closed, partially open, and fully open conditions said draft vent means occupies at that time.

6. The outdoor barbecue grill of claim 5 in which said snuffing means is an ash pan adapted for positioning in the interior of said kettle below said grate means, said ash pan being supported by the upper end of said vertically movable post member, with said coal grate means in turn supported by said ash pan, the bottom wall of said ash pan being adapted to provide a closure for said annular draft vent when said vertical post member is in its lowermost position.

7. The outdoor barbecue grill of claim 6 in which said bottom wall of the kettle includes a flange that extends into the interior of said kettle, said flange together with said vertically movable post member defining an annular draft vent, the bottom wall of said ash pan being adapted to fit against the upper lip of said flange to close said annular draft vent when said vertical post member is in its lowermost position.

8. The outdoor barbecue grill of claim 6 in which a ring member is supported by said ash pan, said ring member having an upstanding generally vertical wall that extends above said coal grate means, the internal diameter of said vertical wall being greater than the diameter of said grate means, whereby said vertical wall prevents the coals that are positioned on said grate means from falling off said grate means.

9. The outdoor barbecue grill of claim 6 in which said ash pan includes an upstanding generally vertical wall that extends above said coal grate means, whereby said vertical wall prevents the coals that are positioned on said grate means from falling off said grate means.

10. The outdoor barbecue grill of claim 5 which includes an ash pan adapted for positioning in the interior of said kettle below said coal grate means, said ash pan being vertically movable with respect to said vertically movable post member, said vertically movable post member engages said grate means at its upper end, and said post member carries an annular snuffing member adapted to close said annular draft vent when said post member is in its lowermost position.

11. The outdoor barbecue grill of claim 4 in which said snuffing means is an ash pan adapted for positioning in the interior of said kettle below said grate means, said ash pan being supported by the upper end of said vertically movable post member, with said coal grate means in turn supported by said ash pan, the bottom wall of said ash pan being adapted to provide a closure for said annular draft vent when said vertical post member is in its lowermost position.

12. The outdoor barbecue grill of claim 11 in which said bottom wall of the kettle includes a flange that extends into the interior of said kettle, said flange together with said vertically movable post member defining an annular draft vent, the bottom wall of said ash pan being adapted to fit against the upper lip of said flange to close said annular draft vent when said vertical post member is in its lowermost position.

13. The outdoor barbecue grill of claim 11 in which a ring member is supported by said ash pan, said ring member having an upstanding generally vertical wall that extends above said coal grate means, the internal diameter of said vertical wall being greater than the diameter of said grate means, whereby said vertical wall prevents the coals that are positioned on said grate means from falling off said grate means.

14. The outdoor barbecue grill of claim 11 in which said ash pan includes an upstanding generally vertical wall that extends above said coal grate means, whereby said vertical wall prevents the coals that are positioned on said grate means from falling off said grate means.

15. The outdoor barbecue grill of claim 4 which includes an ash pan adapted for positioning in the interior of said kettle below said coal grate means, said ash pan being vertically movable with respect to said vertically movable post member, said vertically movable post member engages said grate means at its upper end, and said post member carries an annular snuffing member adapted to close said annular draft vent when said post member is in its lowermost position.

* * * * *

UNITED STATES PATENT AND TRADEMARK OFFICE
CERTIFICATE OF CORRECTION

PATENT NO. : 4,281,633          Page 1 of 3
DATED      : August 4, 1981
INVENTOR(S) : Gunther G. Wackerman It is certified that error appears in the above-identified patent and that said Letters Patent are hereby corrected as shown below:

Col. 5, line 5, delete "in threaded opening."

Delete Col. 5, line 6 through "ward slant, handle" in Col. 5, line 37.

Col. 4, after "received" insert the following:
-- in threaded opening 58. Handle 52 is generally horizontal and includes a midportion that extends through slot 40. Thus, the diameter of handle 52 is no greater than the width of slot 40. Handle 52 further includes an opposite end which extends away from support means 20, and which may include a knob portion 55 that is easily grippable by a user.

In the preferred embodiment shown, the upper end of post member 50 engages bottom wall 36 of ash pan 30. As illustrated in Figure 3, the upper end of post member 50 is slidably received in socket 56, which has a vertical wall with an inner diameter slightly greater than the outer diameter of the post member, and a generally horizontal wall that is secured to bottom wall 36 of ash pan 30. If

UNITED STATES PATENT AND TRADEMARK OFFICE
CERTIFICATE OF CORRECTION

PATENT NO. : 4,281,633
DATED : August 4, 1981
INVENTOR(S) : Gunther G. Wackerman It is certified that error appears in the above-identified patent and that said Letters Patent are hereby corrected as shown below:

desired, thumb screw 57 may be threadably inserted in a threaded opening in the vertical wall of socket 56, to provide a more positive securement between ash pan 20 and vertical post 50.

The ash pan is removable from the kettle (after unscrewing thumb screw 57, if it is present) by lifting the ash pan off the post. To make thumb screw 57 more easily available, vertical slot 42 in hollow column 20 may be extended in the upward direction. Or, alternatively, handle 52 may be unscrewed from post 50 to make it possible to lift ash pan 30 out of kettle 10 with post 50 still secured to it.

Referring to Figures 1 and 2, coal grate 34 is vertically adjustable relative to grill 28 by moving handle 52 in slot 40 from lowermost position 43 to uppermost position

UNITED STATES PATENT AND TRADEMARK OFFICE
CERTIFICATE OF CORRECTION

PATENT NO. : 4,281,633            Page 3 of 3

DATED : August 4, 1981

INVENTOR(S) : Gunther G. Wackerman

It is certified that error appears in the above-identified patent and that said Letters Patent is hereby corrected as shown below:

45 or to either of intermediate positions 47 or 49. Since generally horizontal segments 44 have a downward slant, handle --

Signed and Sealed this

Twenty-fourth Day of February, 1987

Attest:

DONALD J. QUIGG

Attesting Officer      Commissioner of Patents and Trademarks